United States Patent
Yamada et al.

(10) Patent No.: US 6,197,893 B1
(45) Date of Patent: Mar. 6, 2001

(54) DISPERSANT COMPRISING INDANE RING CONTAINING POLYSTYRENESULFONIC ACID COMPOUNDS

(75) Inventors: Junichi Yamada, Narashino; Mituo Sugiyama, Tokyo; Tadashi Iihara, Chiba, all of (JP)

(73) Assignee: Lion Corporation, Tokyo (JP)

( * ) Notice: Subject to any disclaimer, the term of this patent is extended or adjusted under 35 U.S.C. 154(b) by 0 days.

(21) Appl. No.: 08/230,378

(22) Filed: Apr. 20, 1994

Related U.S. Application Data (62) Division of application No. 07/721,944, filed on Jun. 27, 1991, now Pat. No. 5,328,491.

(30) Foreign Application Priority Data

Jun. 29, 1990 (JP) .................................................. 2-172065

(51) Int. Cl.⁷ .............................. C08F 112/08; C08F 8/36
(52) U.S. Cl. ...................................................... 525/333.5
(58) Field of Search .......................................... 525/333.5

(56) References Cited

U.S. PATENT DOCUMENTS

2,446,897 * 8/1948 Young ................................ 526/347.2
4,100,336 * 7/1978 Yax ...................................... 526/237
4,486,574 * 12/1984 Murray .............................. 525/333.4

* cited by examiner

Primary Examiner—Christopher Henderson
(74) Attorney, Agent, or Firm—Burns, Doane, Swecker & Mathis, LLP (57) ABSTRACT

A dispersant comprises a polystyrenesulfonic acid having a weight-average molecular weight in the range of 2,000 to 100,000 or a salt thereof, wherein at least 70% of the terminals of the polymer chain have an indane ring of the formula (I):

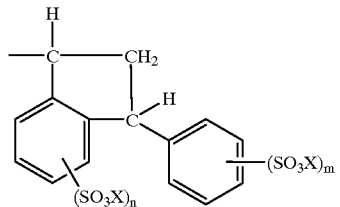

wherein X represents a cation selected from the group consisting of a hydrogen, alkali metals, alkaline earth metals, ammonium and organic amines, and n and m each represent 0 or an integer of at least 1. The dispersant has excellent properties of dispersing organic and inorganic substances and an effect of remarkably improving the stability of a dispersion system such as a coal/water slurry.

8 Claims, 8 Drawing Sheets

DISPERSANT COMPRISING INDANE RING CONTAINING POLYSTYRENESULFONIC ACID COMPOUNDS

This application is a divisional of application Ser. No. 07/721,944, filed Jun. 27, 1991 and now U.S. Pat. No. 5,328,491.

BACKGROUND OF THE INVENTION

The present invention relates to a dispersant having excellent properties of dispersing organic and inorganic substances and an effect of remarkably improving the stability of the dispersion system. In particular, the present invention relates to a dispersant for a coal/water slurry which dispersant exhibits excellent effects of increasing the concentration and improving stability of the slurry when it is left to stand.

It is known that polystyrenesulfonic acid produced by sulfonating polystyrene and salts thereof are usable as antistatic agents, dispersants and various other agents. They are used as, for example, antistatic agents for papers [Japanese Patent Publication for Opposition Purpose (hereinafter referred to as "J.P. KOKOKU") No. Sho 57-53953], antistatic agents for resins [Japanese Patent Unexamined Published Application (hereinafter referred to as "J.P. KOKAI") No. Sho 59-8741], dispersants for coal/water slurry (J.P. KOKAI Nos. Sho 57-145187, Sho 62-590 and Sho 63-278997 and Japanese Patent Application No. Hei-1-338564), and dispersants for cements (J.P. KOKAI Nos. Sho 51-525, Sho 51-64527, Sho 56-41866, Sho 57-156355, Sho 60-46956 and Sho 63-25251). The polystyrenesulfonic acid and salts thereof are usually produced by polymerizing styrenesulfonic acid monomer or by sulfonating polystyrene. They have a structure shown the following general formula (II) or the like:

(II)

wherein l represents an integer and k represents 0 or an integer of at least 1. Although styrene of l recurring units in the above formula has one $SO_3X$ group, some of the recurring units may have 0 or two or more $SO_3X$ groups.

Although these known polymers exhibit an excellent effect for increasing the concentration of the dispersion system, their effect of improving the stability of the dispersion system is yet insufficient.

SUMMARY OF THE INVENTION

A primary object of the present invention is to provide a new dispersant, in particular, capable of improving the stability of a dispersion system.

This and other objects of the invention will be apparent from the following description and Examples.

The inventors have found that the stability of the dispersion system can be improved by using a sulfonated polystyrene having a specified amount of indane ring at a terminal of the styrene recurring unit.

Namely, the present invention provides a dispersant comprising a polystyrenesulfonic acid having a weight-average molecular weight in the range of 2,000 to 100,000 or a salt thereof, wherein at least 70% of the terminals of the polymer chains have an indane ring of the formula (I):

(I)

wherein X represents a cation selected from the group consisting of a hydrogen, alkali metals, alkaline earth metals, ammonium and organic amines, and n and m each represent 0 or an integer of at least 1.

BRIEF DESCRIPTION OF THE DRAWINGS

FIGS. 2 are a GC-MS gas chromatogram (A) of the dispersant of the present invention and an MS spectrum (B) thereof.

DESCRIPTION OF THE PREFERRED EMBODIMENTS

In the present invention, other terminals of the polymer than the indane ring of the above formula (I) have a structure shown by the following formula (III):

(III)

The part of the polymer other than its terminals comprises recurring units having a structure of the following general formula (IV):

(IV)

wherein X and n are as defined above.

The polymers used in the present invention are preferably those having a molecular weight of 2,000 to 50,000 and a degree of sulfonation of at least 60%, preferably 80 to 95%, based on the styrene units.

In the formula (I), n and m are preferably not zero at the same time. X in the formula is preferably an alkali metal such as sodium or potassium, an alkaline earth metal such as calcium or magnesium or ammonium cation, more preferably sodium, calcium or ammonium.

The polystyrene having an indane ring at the terminal thereof used in the present invention can be produced by cationic polymerization of commercially available styrene monomer. It is preferred to use a metal halide, particularly a metal chloride, as the polymerization catalyst. Examples of them include tin dichloride, tin tetrachloride, aluminum chloride and titanium tetrachloride. other cationic polymerization catalysts are also usable. However, when, for example, $BF_3$ is used, the relative amount of the polystyrene having the indane ring at the terminal is reduced to about 50%. The amount of the catalyst used is preferably 0.01 to 1% by weight based on the styrene monomer.

Halogenated hydrocarbons are used as the reaction solvent. They include dichloromethane, chloroform, carbon tetrachloride, dichloroethane and tetrachloroethane.

Although the weight ratio of the solvent used for the polymerization reaction to the styrene monomer is not particularly limited, it is preferably 10/90 to 90/10, more preferably 20/80 to 80/20, from the viewpoints of the control of the reaction system and after-treatment.

The polymerization reaction is preferably conducted by previously heating the reaction solvent to a predetermined temperature and then adding styrene monomer dropwise to the reaction system to conduct the polymerization. After completion of the addition of the styrene monomer, the reaction is completed by aging. It is also possible to further add the catalyst after completion of the addition in order to accelerate the completion of the reaction.

The polymerization temperature usually ranges 30 to 150° C.

After completion of the reaction, the remaining catalyst is neutralized with ammonia or the like by an ordinary method and a precipitate thus formed can be removed by filtration or by washing with water. The remaining catalyst can be removed also by adsorbing it on an adsorbent and then filtering it.

The styrene polymer having the indane ring at the terminals in an amount of at least 70%, preferably 80 to 95% obtained by the above-method, is sulfonated by an ordinary method to obtain the dispersant of the present invention.

Examples of the sulfonation reaction conditions are as follows: the sulfonation can be conducted with sulfuric anhydride, fuming sulfuric acid, chlorosulfonic acid or sulfuric acid as the sulfonating reagent. These sulfonating reagents can be directly added dropwise to the reaction system or, alternatively, they can be introduced into the reaction tank together with polystyrene to continuously conduct the sulfonation. Sulfuric acid anhydride can be introduced into the system after dilution with nitrogen or dry air or, alternatively, it is reacted with dioxane or the like to form a complex to be added dropwise.

The reaction solvents usable herein are those inert to the sulfonating reagent. The solvents inert to the sulfonating reagent include halogenated hydrocarbons such as dichloromethane, chloroform, carbon tetrachloride, dichloroethane and tetrachloroethane. When such a solvent is used as the polymerization solvent, the sulfonation can auto be conducted without changing the solvent.

After completion of the sulfonation, the solvent is removed and the product is neutralized to obtain the new dispersant usable in the present invention.

The dispersant thus produced is practically used directly in the form of the aqueous slurry having a concentration of about 5 to 50%, concentrate having a concentration of 50 to 60% or powder prepared by drying by an ordinary method.

The dispersant of the present invention is usable for any dispersion system for which an ordinary dispersant is usable. For example, it is usable as a dispersant for organic dispersions such as a coal dispersion, pigment dispersion, dye dispersion, paint dispersion, developer dispersion, microcapsule dispersion; as a dispersion stabilizer for suspension polymerization; as a levelling agent for a dye; or as a dispersant for inorganic dispersions such as silica or $TiO_2$ dispersion. The dispersant of the present invention is effective for stabilizing a dispersion such as a concrete admixture and particularly coal/water slurry. Thus it is effective for inhibiting coagulation of a slurry. The dispersant for the coal/water slurry is effective for preparing an aqueous slurry of anthracite, bituminous coal, sub-bituminous coal or brown coal. The amount of the dispersant is usually selected so that the amount of the polymer of the present invention will be in the range of 0.05 to 3.0% by weight based on the coal/water slurry.

When the coal/water slurry is to be produced by using the polymer of the present invention, the polymer can be added as it is to the fine coal powder or it can be used in the form of an aqueous solution thereof having a concentration of about 5 to 50% by weight. The mixture of the fine coal powder and water can be produced by, for example, a method wherein the coal is dry-pulverized to a desired particle size by means of a pulverizer such as a crusher or ball mill, water is added thereto in an amount determined so that the fine coal powder concentration in the final high-concentration coal/water slurry will be 55 to 75% in due consideration of water content of the fine coal powder and water content of the dispersant and they are homogeneously mixed with kneader, co-kneader or Bambury mixer; a method wherein the coal is pulverized to a desired particle size in the presence of water in an excess amount by means of a pulverizer such as a ball mill or rod mill and it is dehydrated so that the coal concentration in the final high-concentration coal/water slurry will be 55 to 75% in due consideration of water content of the dispersant; or a method wherein coal and water are mixed together to obtain a mixture of a predetermined concentration and the mixture is ground to a desired particle size by means of a pulverizer such as ball mill or rod mill to obtain a homogeneous mixture.

According to the present invention, a dispersant having a quite excellent dispersion stability is provided.

The following Examples will further illustrate the present invention.

EXAMPLE 1

200 g of ethylene dichloride as solvent was placed in a flask and 0.7 g of tin tetrachloride as catalyst was added thereto. The temperature was elevated to 70° C. while the reaction mixture was stirred and then 200 g of styrene was added dropwise thereto for 1 h. The stirring was continued at 84° C. for 5 h to complete the reaction. The weight-average molecular weight of the polymer (Polymer-1) determined by gel permeation chromatography was 7,500.

300 g of a solution of Polymer-1 in ethylene dichloride was diluted with 450 g of ethylene dichloride and sulfonation was conducted with sulfuric acid anhydride as the sulfonating reagent in molar ratio of 1.05:1 to synthesize a dispersant of the present invention (Polymer-2). The weight-average molecular weight of the polymer (Polymer-2) determined by gel permeation chromatography was 15,000.

The properties of the polymers were determined as follows:

(1) Weight-Average Molecular Weight of Polymer-1:

The weight-average molecular weight of Polymer-1 was determined by GPC method by using standard polystyrene as the standard substance, TSK G1000HXL (7.8 mm ID×30 cm) (a product of Toso Co., Ltd.) was used as the separation column and an ultraviolet ray detector (wave length: 266 nm) was also used. When styrene was detected in the sample, the weight-average molecular weight was determined by excluding styrene.

(2) Weight-average Molecular Weight of Polymer-2:

The weight-average molecular weight of Polymer-2 was determined by GPC method by using standard sodium polystyrenesulfonate as the standard substance, TSK G3000SW (7.5 mm ID×30 cm) and TSK G4000SW (7.5 mm ID×30 cm) (products of Toso Co., Ltd.) as the separation columns and an ultraviolet ray detector (wave length: 238 nm). When styrenesulfonic acid was detected in the sample, the weight-average molecular weight was determined by excluding styrenesulfonic acid.

(3) Recognization of Terminal Indane Ring of Polymer-1

Polymer-1 was examined with 400 M NMR (GSX-400; a product of JEOL., Ltd.) and $CDCl_3$ solvent under conditions comprising a determination temperature of 25° C., integrated circuit (16 times), pulse angle of 45° and pulse intervals of 5 sec. The presence of indane ring was confirmed by proton NMR. The NMR chart is shown in FIG. 1.

Figure 1:
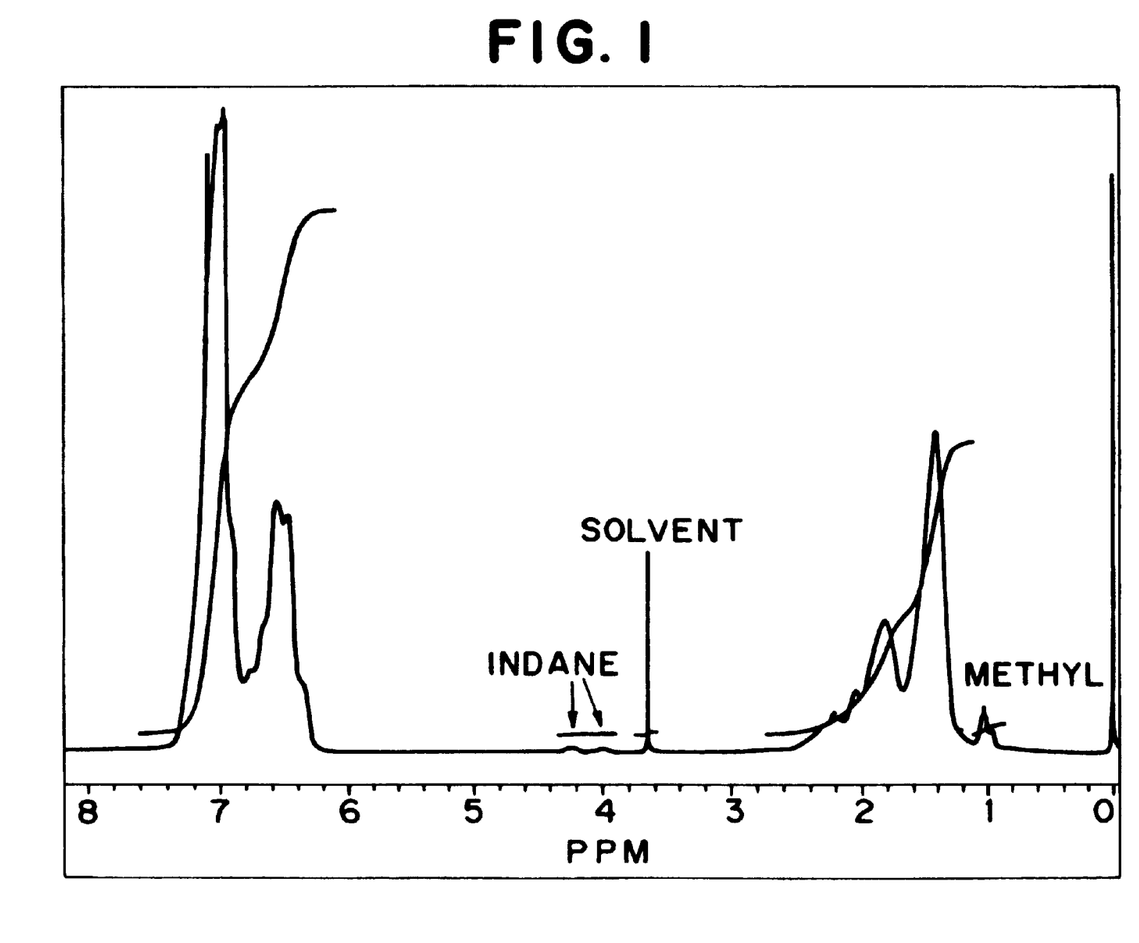
FIG. 1 is an NMR chart of polystyrene used as a starting material for the dispersant of the present invention.

In FIG. 1, the shift position of each proton was as follows:

Proton Shift Position (PPM)

A: 1.1, B: 1.4 to 2.8, C: 4.1 to 4.5 benzene ring 6.4 to 7.4.

The polymer having terminal indane ring was determined by enlarging a part (5 to 10 ppm) of the NMR chart of FIG. 1 and calculating the ratio of protons in the indane ring to protons in the terminal methyl group from the integration curve. As a result, it was found that 90% of the polymer produced by the synthesis process of the present invention had terminal indane ring.

(4) Characteristic Peak of Indane Ring

The characteristic peak showing the presence of the indane ring was determined by analyzing the low molecular components by the following GC-MS and NMR. At first, a low molecular fraction (about hexamer or below) was extracted from the styrene polymer produced by the process of the invention with methanol extractant and the analysis was conducted by GC-MS. The GC-MS determination conditions were as shown below:

GC: packing for the column: Ultra 2 (5% phenylmethyl silicone)
Column size: inner diameter of 0.2 mm and length of 12.5 m
Carrier gas: helium flow rate: 1.0 ml/min
Column temperature: 40° C.→300° C. (15° C./min)
Split ratio: 100:1
MS: Ionization mode: electron impact (E.I.)
Ionic voltate: 70 eV
Accelerating voltage: 3 kV
Molecular weight range: 35 to 500.
Scan speed: 1 sec.

Figure 2A:
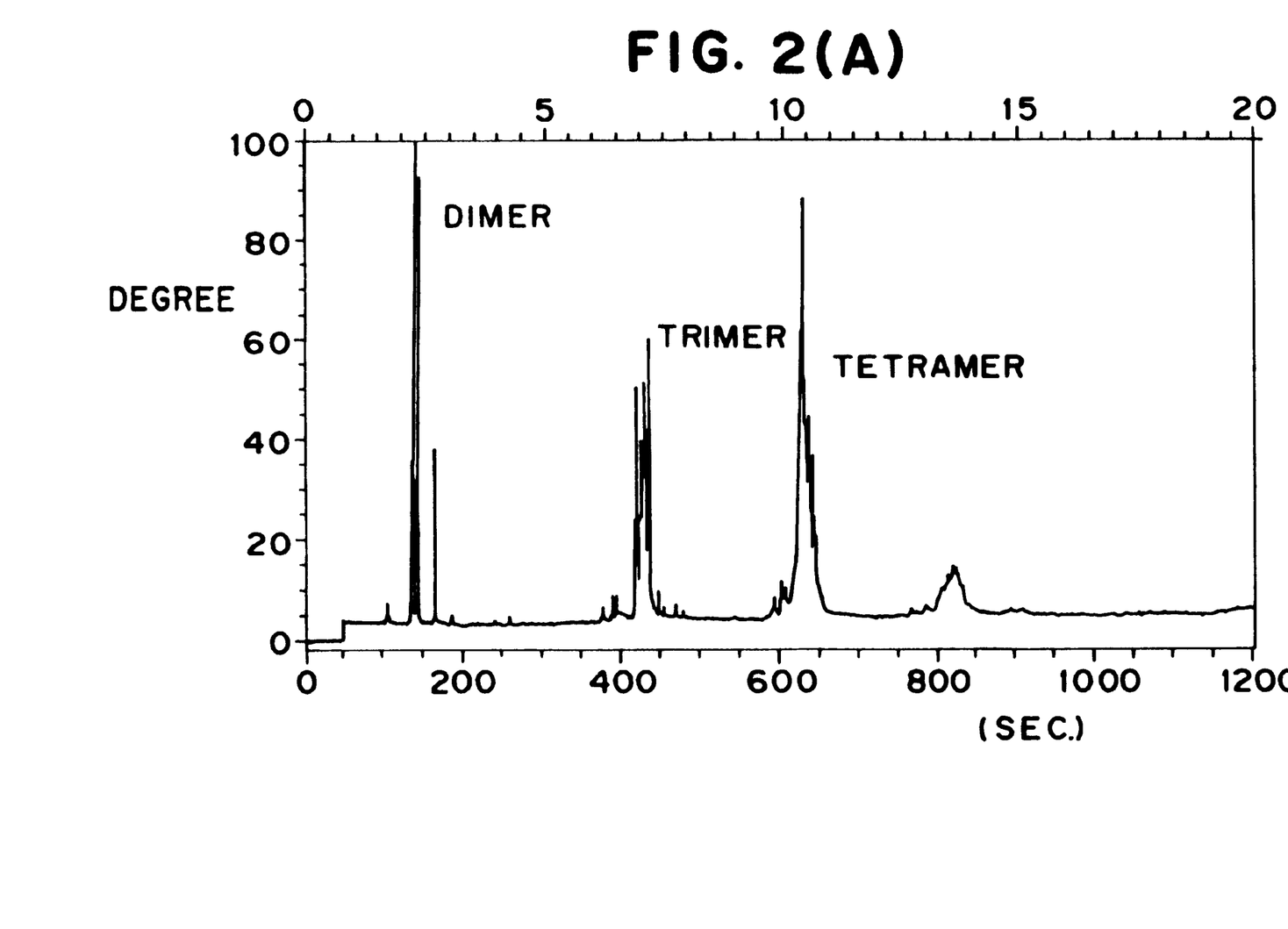
Figure 2B:
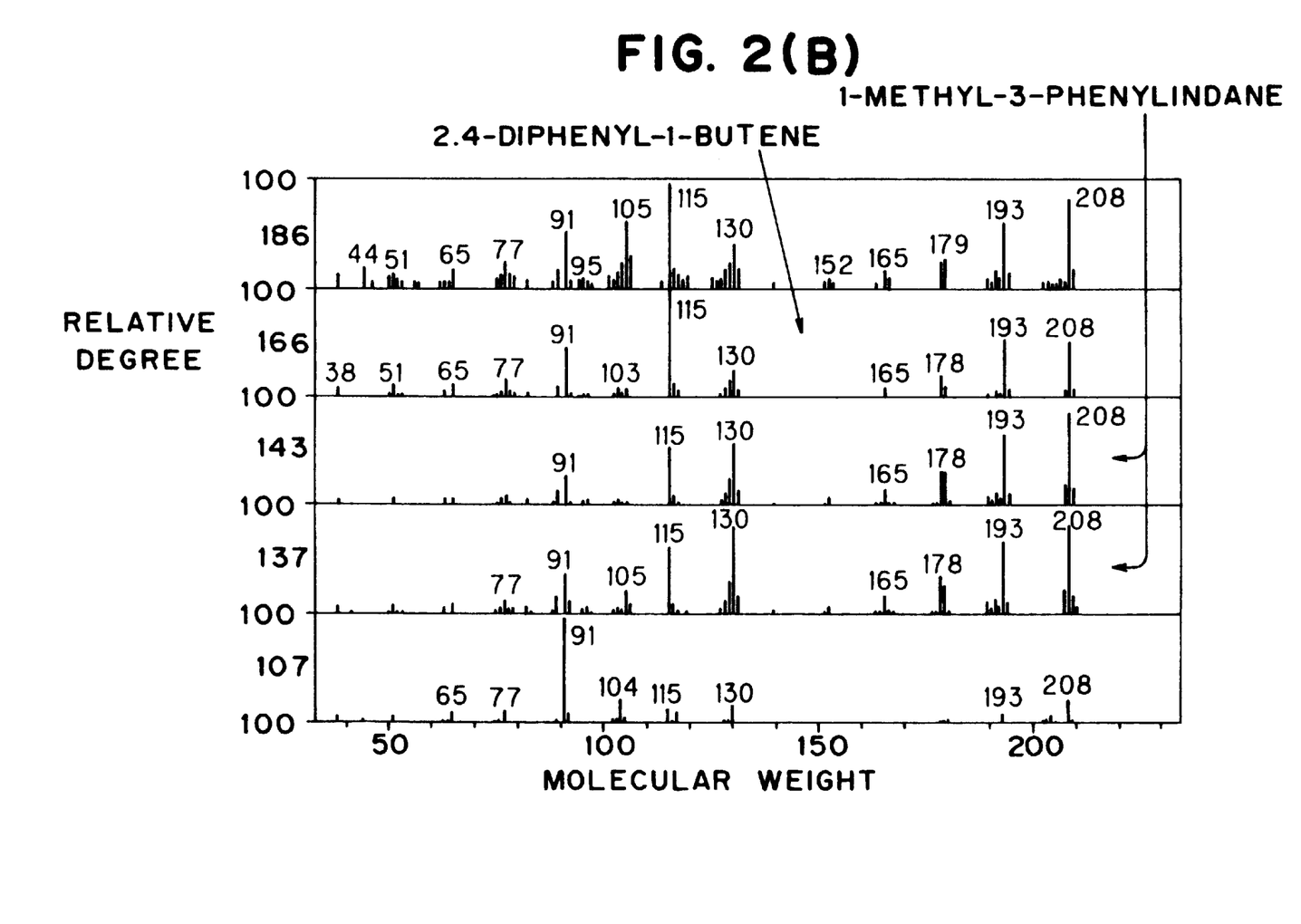

The gas chromatogram of GC-MS and MS spectral chart are shown in FIG. 2.

Figure 3:
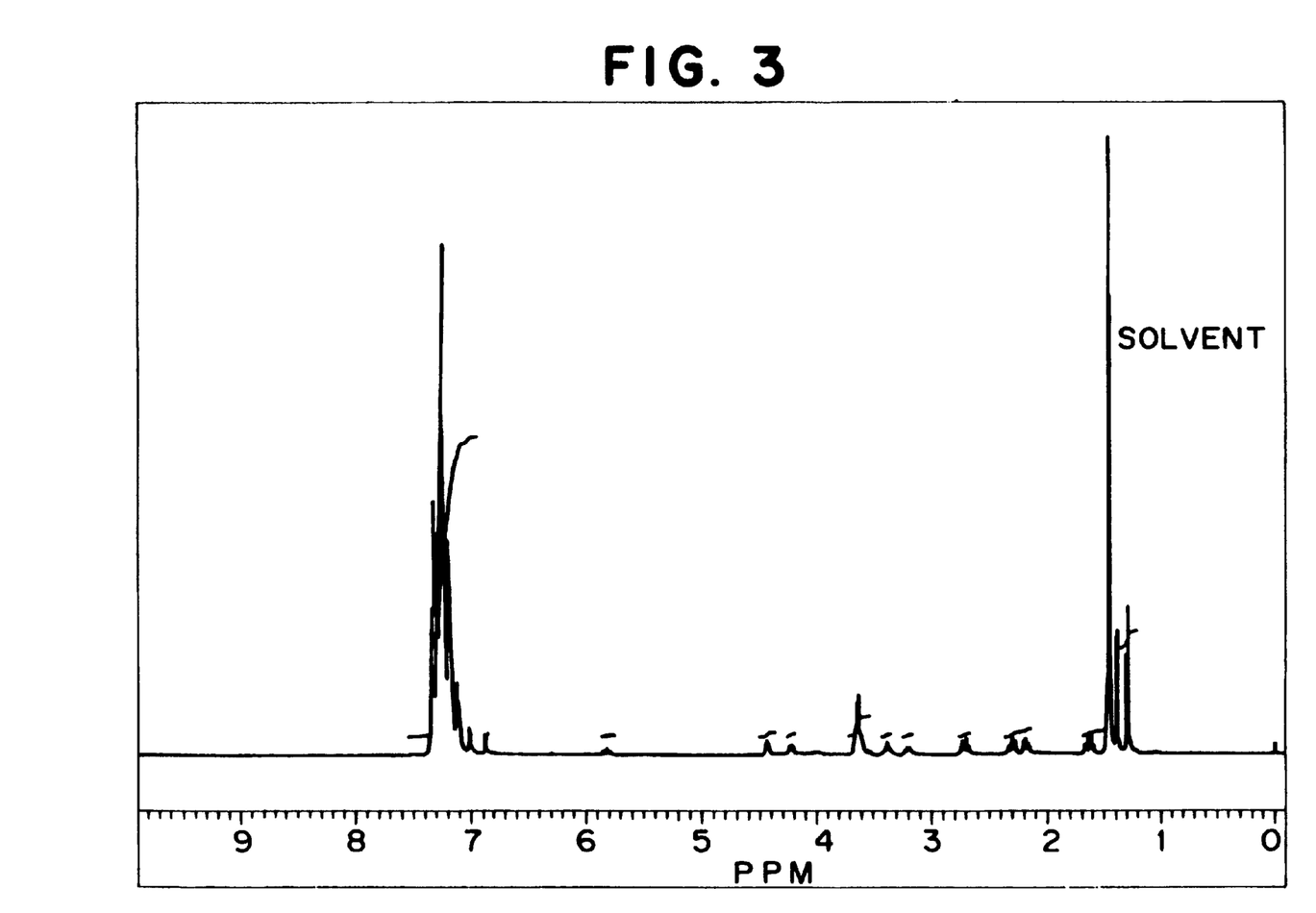
FIG. 3 is an NMR chart of the dispersant of the present invention.

From the data file based on the parent peaks of MS spectrum and the fragment peaks, it was found that the two main components of the dimers were two optical isomers of 1-methyl-3-phenylindane and the balance was 2,4-diphenyl-1-butene. From the area ratio in the gas chronatogram, it was found that it comprised 93% of 1-methyl-3-phenylindane and 7% of 2,4-diphenyl-1-butene. To confirm the structure of this substance by NMR, the dimer fraction was taken from low molecular fraction by gel permeation chromatography [SC-8010 series (a product of Toso Co., Ltd.), Column G 4000 H and column G 1000 H, detector UV, wave length 238 nm, flow rate 0.5 ml/min, determination temperature: 40° C.]. The NMR chart of the dimer is shown in FIG. 3.

The dimer was analyzed by proton MNR and proton proton COSY method to find that the main components of the dimer were two optical isomers of 1-phenyl-2-methylindane. These results supported the results of GC-MS. The shift positions of the respective protons in the NMR chart in FIG. 3 were assigned to as follows on the basis of the analytical results of the COSY chart.

Proton shift position (PPM)

| a1: 1.4 | b1: 1.3 |
|---|---|
| a2: 3.2 | b2: 3.4 |
| a3: 2.7 | b3: 2.2 |
| a4: 1.6 | b4: 2.3 |
| a5: 4.2 | b5: 4.4 |
| benzene ring: 7.1 to 7.3 | benzene ring 7.1 to 7.3 |

According to the NMR analysis, it was found that the proton on the α-position carbon of the benzene ring of 1-methyl-3-phenylindane has a specific peak at 4 to 4.5 ppm. The relative amount of the polymer having the indane ring was determined on the basis of the proton peak.

Figure 4:
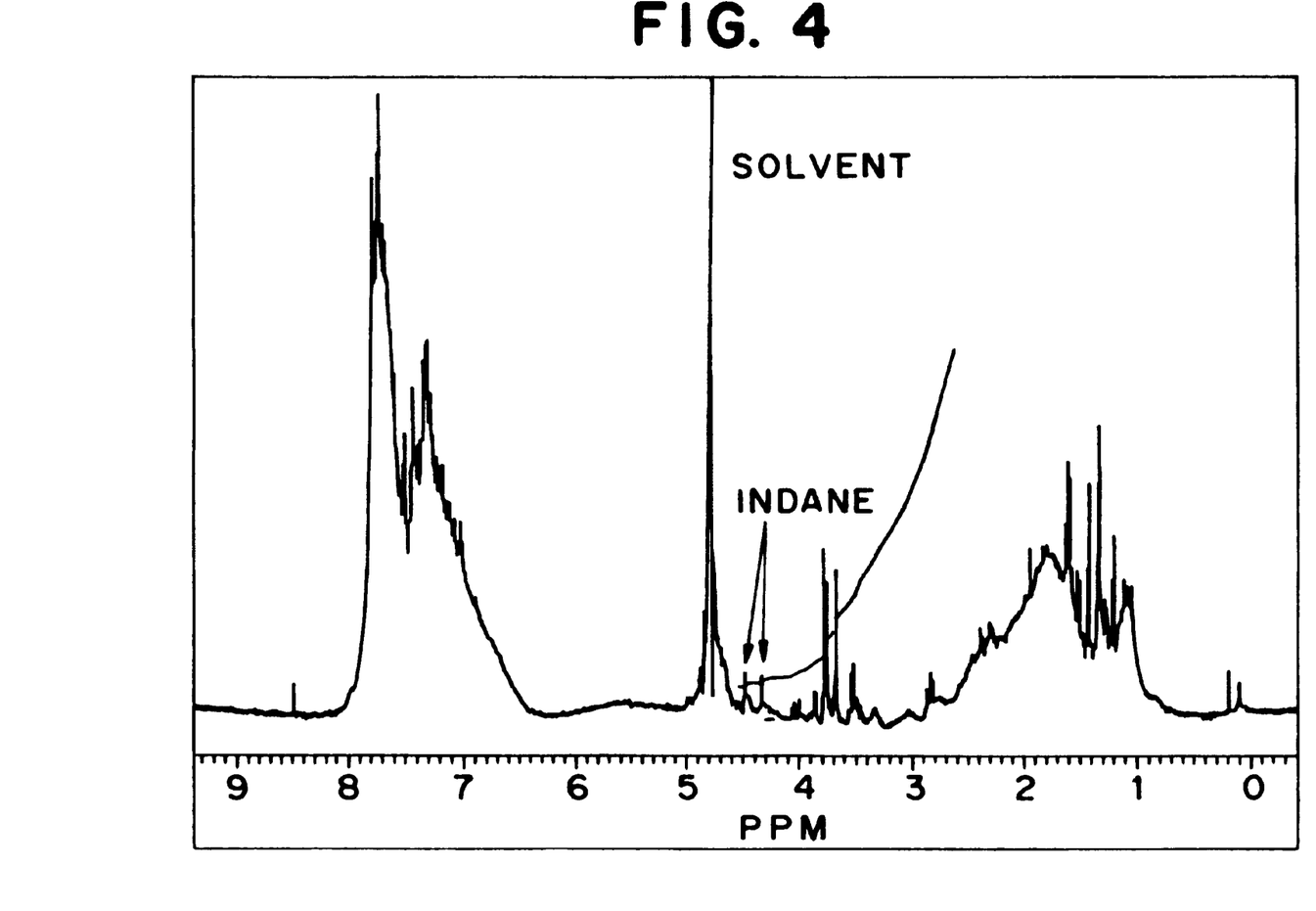
FIG. 4 is an NMR chart of a lower molecular part of the dispersant of the present invention.

(5) Indane Ring of Polymer-2:

The presence of-indane ring of the sulfonated polymer (Polymer-2) was examined by NMR (under the same conditions as those of the above-described NMR determination except that heavy water was used as the solvent and that the number of integration was changed to 32). However, no peaks of indane ring could be recognized, since the peaks were widened because the relative amount of the indane ring in the polymer was very small in the polymer-2 and heavy water was used as the solvent. Therefore, a low molecular part which supposedly contained a larger relative amount of the indane ring was subjected to the NMR analysis. In this process, ethanol-soluble matter was extractd from the synthesized polymer and the resulting low-molecular sample (about hexamer or lower) was analyzed in the same manner as that described above. The results are shown in FIG. 4. The presence of the indane ring could be recognized in FIG. 4.

From these results, it was found that 90% of the polymer in the dispersant of the present invention contained terminal indane ring. The sulfonation rate of Polymer-2 was 90%.

EXAMPLE 2

200 g of ethylene dichloride as solvent was placed in a flask and 1.0 g of tin tetrachloride as catalyst was added thereto. The temperature was elevated to 84° C. while the reaction mixture was stirred and then 200 g of styrene was added dropwise thereto for 1 h. The stirring was continued at 84° C. for 5 h to complete the reaction. The weight-average molecular weight of the polymer (Polymer 3) was 4,000.

300 g of a solution of Polymer 3 in ethylene dichloride was diluted with 450 g of ethylene dichloride and sulfonation was conducted with sulfuric acid anhydride as the sulfonating agent in molar ratio of 1.05:1 to synthesize a dispersant of the present invention (Polymer 4). The weight-average molecular weight of the polymer (Polymer-4) was 8,000. It was examined in the same manner as that of Example 1 to find that 90% thereof had terminal indane ring. The sulfonation rate of Polymer-4 was 86%.

EXAMPLE 3

200 g of ethylene dichloride as solvent was placed in a flask and 0.6 g of tin tetrachloride as catalyst was added thereto. The temperature was elevated to 30° C. while the reaction mixture was stirred and then 200 g of styrene was added dropwise thereto for 3 h. The stirring was continued at 30° C. for 72 h to complete the reaction. The weight-average molecular weight of the polymer (Polymer-5) was 15,000.

300 g of a solution of Polymer-5 in ethylene dichloride was diluted with 450 g of ethylene dichloride and sulfonation was conducted with sulfuric acid anhydride as the sulfonating reagent in molar ratio of 1.05:1 to synthesize a dispersant of the present invention (Polymer-6). The weight-average molecular weight of the polymer (Polymer-6) was 30,000. It was examined in the same manner as that of Example 1 to find that 91% thereof had terminal indane ring. The sulfonation rate of Polymer-6 was 93%.

EXAMPLE 4

Stainless steel balls were placed in a 6 liter stainless steel ball mill (inner diameter: 19 cm) to fill 50% of the mill. 465 g of water and 1,000 g of bituminous coal (Mt. Tholey coal) roughly pulverized to a particle size of 3 mm or below were placed in the ball mill and then the dispersant of the present invention (Polymer-2, 4 or 6, counter ion: Na) was added thereto in such an amount that it would be 0.4% by weight based on the slurry. The ball mill was rotated at 65 rpm to pulverize the coal. The particle size of the coal was determined with a laser diffraction-type size distribution measuring device and the pulverization was continued until 80% of the coal had a particle diameter of 74 μm or below. After completion of the pulverization with the ball mill, the coal/water slurry was taken out of the mill and it was further stirred in a homomixer at 4000 rpm for 10 min to obtain a coal/water slurry.

The properties of the coal used in the experiment are given in Table 1 and the results of the determination are given in Table 2.

TABLE 1

| | Item | Analytical value (wt. %) |
|---|---|---|
| Technical analysis | Water content | 4.4 |
| | Ash content | 14.0 |
| | Volatile matter | 32.4 |
| | Fixed carbon | 49.2 |
| Elementary analysis | C | 84.3 |
| | H | 5.4 |
| | N | 1.8 |
| | O | 8.1 |
| | S | 0.4 |

The resultant slurry was evaluated by the following methods:

(a) Viscosity of Slurry:

The viscosity of the slurry was determined with a Haake rotational viscometer at 25 ° C. and the viscosity at 100 sec$^{-1}$ down was determined from the rheogram.

(b) Stability of Slurry Left to Stand:

The stablity was tested by pot test method, wherein a slurry produced as described above was placed in a 250 ml wide-mouth polymer bottle and left to stand at 25° C. for 10 days. Then it was poured on a 1 mm sieve, then the quantity of the slurry remaining on the sieve (% by weight based on the whole slurry) was determined, the slurry remaining in the polymer bottle was stirred with a spatula and the hardness of the precipitate layer was organoleptically classified as follows to determine the stability:

○: The slurry was soft.

Δ: The slurry was hard.

x: The slurry was quite hard.

COMPARATIVE EXAMPLE 1

Figure 5:
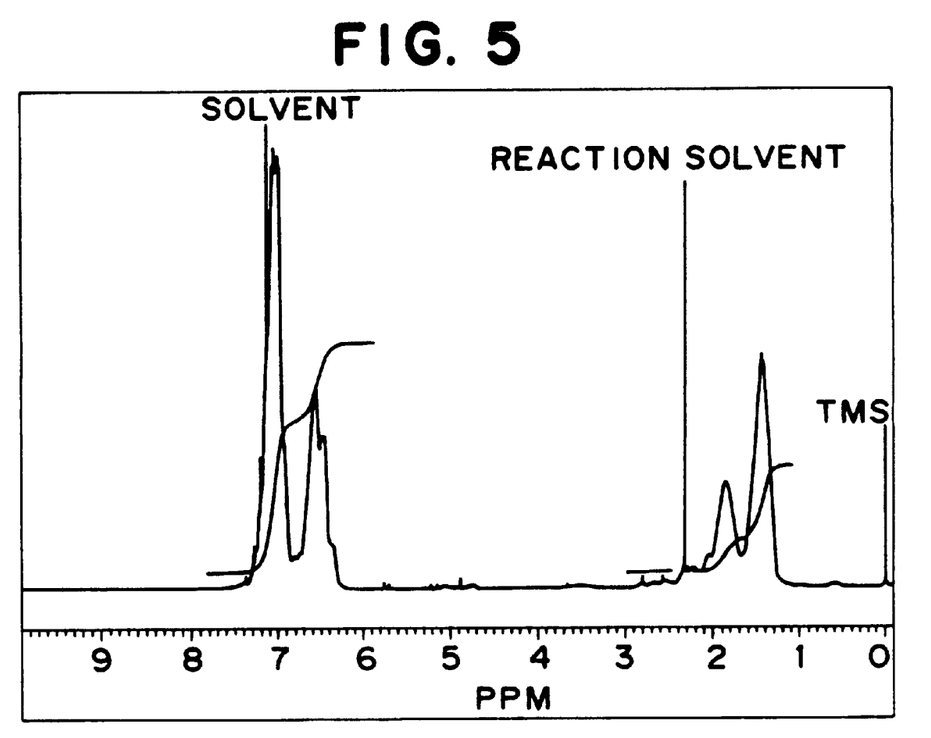
FIG. 5 is an NMR chart of starting polystyrene for a comparative dispersant.
Figure 6:
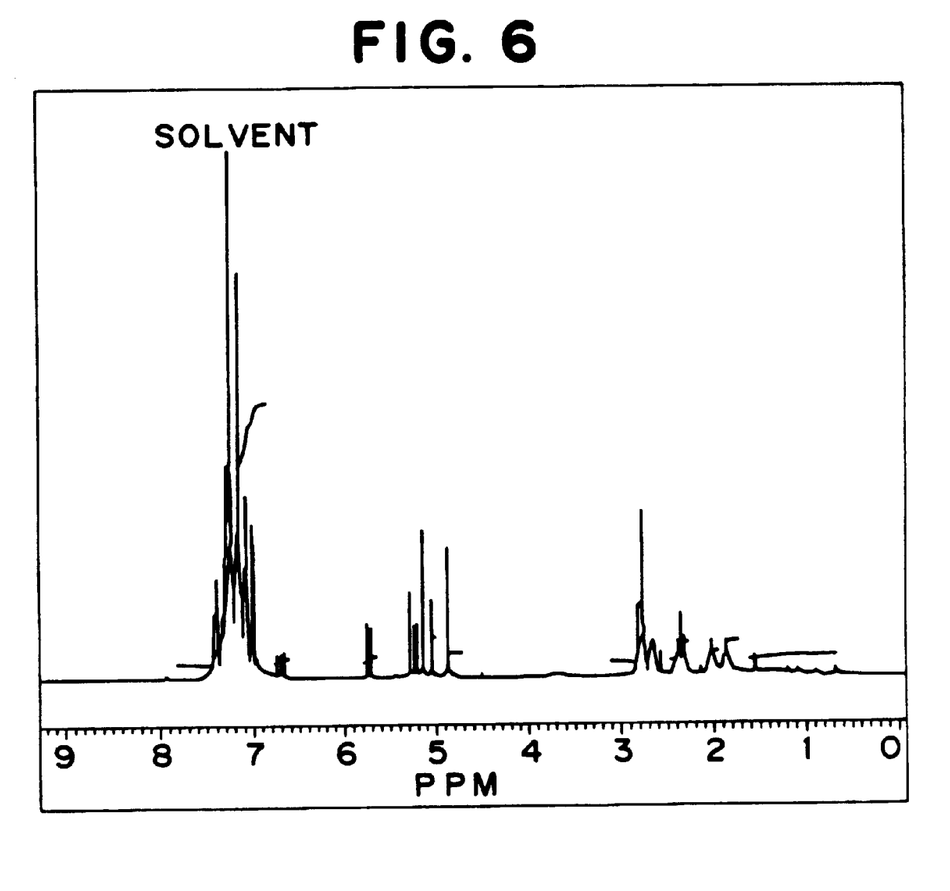
FIG. 6 is an NMR chart of a comparative dispersant.

A polystyrene (weight-average molecular weight: 7,500) synthesized by radical polymerization was sulfonated in the same manner as that of Synthesis Example 1. The effects of the resulting polymer as the dispersant for coal/water slurry was examined in the same manner as that of Example 4. The results are shown in Table 2. The NMR chart of the polystyrene before the sulfonation and that of methanol-soluble matter (about hexamer or lower) are shown in FIGS. 5 and 6, respectively. Since no peak at 4.1 to 4.5 which indicates the presence of the indane ring was observed in the figure, it was found that the polystyrene had no indane ring and that the sulfonated product thereof was different from the dispersant of the present invention. (NMR determination conditions were the same as the polymer analysis conditions of the present invention).

Figure 7:
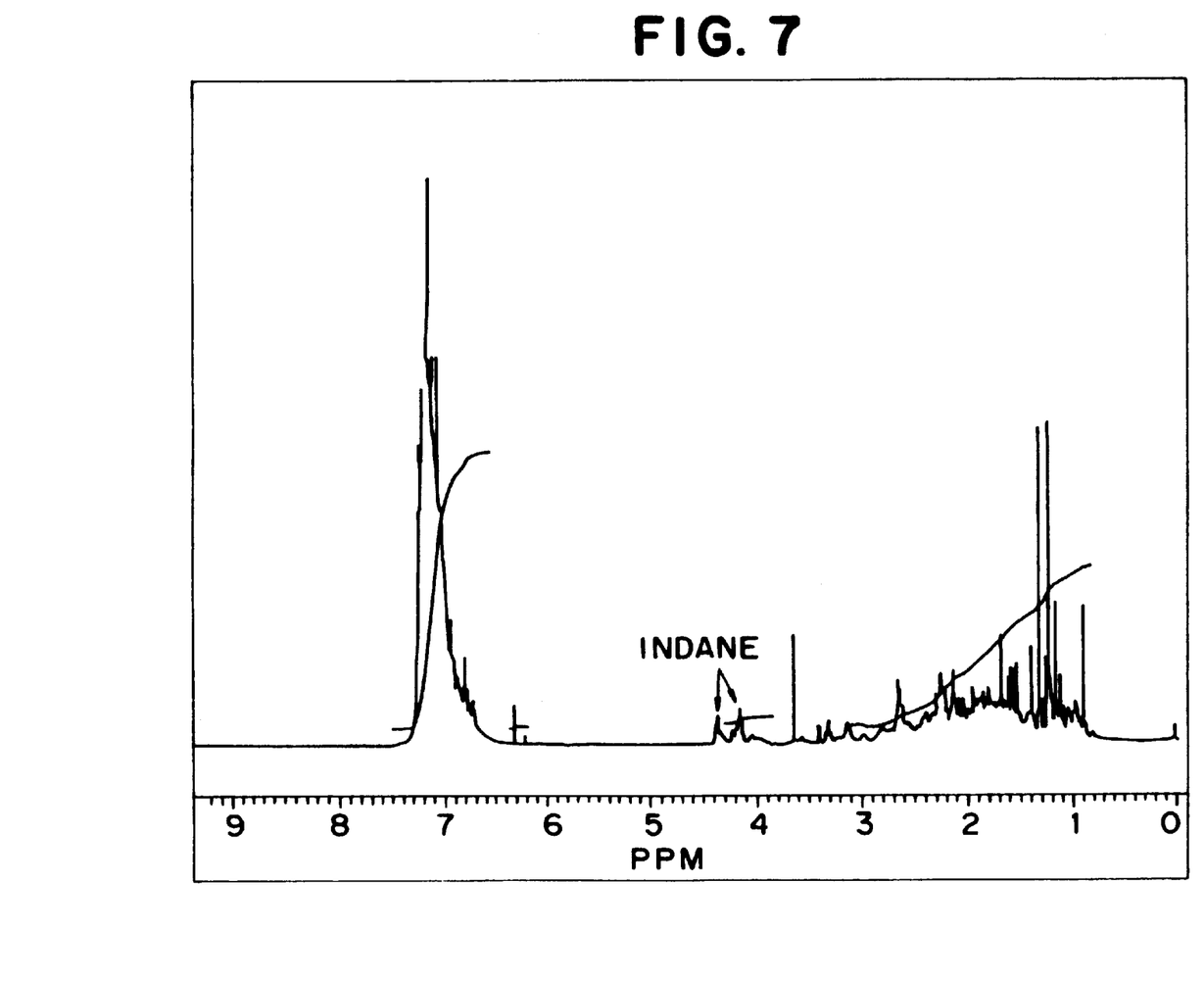
FIG. 7 is an NMR chart of a methanol-soluble part of the starting polystyrene for the dispersant of the present invention.

For reference, NMR chart of methanol-soluble polymer of the present invention (Example 1) before the sulfonation is given in FIG. 7.

TABLE 2

Results of determination of properties of coal/water slurry

| | | | | Stability | |
|---|---|---|---|---|---|
| | | Molecular weight | Viscosity (cP) | Amount of slurry on the sieve (%) | Hardness of the precipitate |
| Present invention | Polymer-4 | 8,000 | 850 | 3 | ○ |
| | Polymer-2 | 15,000 | 800 | 4 | ○ |

TABLE 2-continued

Results of determination of properties of coal/water slurry

| | | | Stability | |
|---|---|---|---|---|
| | Molecular weight | Viscosity (cP) | Amount of slurry on the sieve (%) | Hardness of the precipitate |
| Polymer-6 | 30,000 | 790 | 6 | ○ |
| Comparative Example | 15,000 | 790 | 11 | ○ |

When the polymer of the present invention was used as the dispersant, the amount of the aggregate of the slurry [amount of that remaining on the sieve (%)] was reduced to ⅓ as compared with that remaining when a known dispersant was used.

EXAMPLE 5

The fluidity of concrete and amount of air were determined by using Polymer-2 produced in Example 1 (molecular weight: 15,000, counter ion: Ca) and radical-polymerized polystyrenesulfonate (molecular weight: 15,000, counter ion: Ca) produced in Comparative Example 1 as the super plasticizer for flowing concrete according to Nippon-Kenchiku Gakkai JASS ST-402 (the standard estimation for flowing concrete) and, in addition, the separation of aggregates caused when the additive was added in an excess amount was also examined.

The materials used were as follows and the obtained composition is shown in Table 3.

Materials Used:
Cement: ordinary portland cement (specific gravity: 3.15)
Fine aggregate: sand produced in Kasima district (specific gravity: 2.62)
Coarse aggregate: crushed stone from Tsukui Lake (specific gravity: 2.66)

TABLE 3

| | | Composition | | | |
|---|---|---|---|---|---|
| Cement | Water | Water/ cement | Fine aggregate | Coarse aggregate | s/a |
| 320 | 179 | 55.9% | 794 | 991 | 45% |

Note 1) 0.028 % of an air entraining agent was used so that the amount of air in the concrete would be 4.5%.
Note 2) s/a = fine aggregate / (fine aggregate + coarse aggregate) (%)

50 l of a concrete having a composition given in Table 3 was kneaded with an lancaster mixer (100 l) for 90 sec. The slump value of the base concrete was 8.0 cm and the quantity of air was 4.3%. After leaving to stand for 15 min, 0.1% (by weight), based on the cement, of the polymer of the present invention was added thereto as the dispersant and they were kneaded for 30 sec. Then the slump value of the concrete and the quantity of air were determined. To examine the influence of the excess amount of the dispersant added thereto, the similar test was also conducted except that the amount of the dispersant was increased to 0.25% by weight. The similar test was repeated by using the radical-polymerized product. The test results are given in Table 4. It will be apparent that the fluidizing agent of the present invention exerts an excellent effect of reducing the separation of the aggregate.

TABLE 4

Results of concrete property test

| | Present invention | | Comparative Example |
|---|---|---|---|
| Amount of fluidizing agent added (% based on cement) | 0.1 | 0.25 | 0.25 |
| Base concrete Slump (cm) | 8.0 | 8.0 | 8.0 |
| Quantity of air (%) | 4.3 | 4.3 | 4.3 |
| Flowing concrete slump (cm) | 19.1 | 22.7 | 22.5 |
| Quantity of air (%) | 4.3 | 4.5 | 4.6 |
| Aggregate separation | none | none | separated |

What is claimed is:

1. A dispersant comprising a polystyrenesulfonic acid having a weight-average molecular weight in the range of 2,000 to 100,000 or a salt thereof, wherein at least 70% of the terminals of the polymer chains have an indane ring of the formula (I):

(I)

wherein X represents a cation selected from the group consisting of a hydrogen, alkali metals, alkaline earth metals, ammonium and organic amines, and n and m each represent 0 or an integer of at least 1.

2. A dispersant of claim 1 wherein other terminals of the polymer than the indane ring of the formula (I) have a structure shown by the following formula (III):

(III)

3. A dispersant of claim 1 wherein the part of the polymer other than its terminals comprises recurring units having a structure of the following general formula (IV):

(IV)

wherein X and n are as defined in the formula (I).

4. A dispersant of claim 1 wherein the polystyrenesulfonic acid has a weight-average molecular weight in the range of 2,000 to 50,000.

5. A dispersant of claim 1 wherein the polystyrenesulfonic acid has a degree of sulfonation of at least 60% based on the styrene units.

6. A dispersant of claim 1 wherein n and m in the formula (I) cannot both be zero.

7. A dispersant of claim 1 wherein X in the formula (I) is an alkali metal, an alkaline earth metal or ammonium cation.

8. A dispersant of claim 1 wherein it comprises the polystyrenesulfonic acid or a salt thereof, and a balance of water.

* * * * *